US006952367B2

(12) United States Patent
Riesenman et al.

(10) Patent No.: US 6,952,367 B2
(45) Date of Patent: *Oct. 4, 2005

(54) OBTAINING DATA MASK MAPPING INFORMATION

(75) Inventors: Robert J. Riesenman, Sacramento, CA (US); James M. Dodd, Shingle Springs, CA (US); Michael W. Williams, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,025

(22) Filed: Nov. 3, 2003

(65) Prior Publication Data

US 2004/0093471 A1 May 13, 2004

Related U.S. Application Data

(63) Continuation of application No. 10/104,837, filed on Mar. 22, 2003, now Pat. No. 6,801,459.

(51) Int. Cl.[7] .............................................. G11C 16/04
(52) U.S. Cl. .............................. 365/185.11; 365/230.06
(58) Field of Search ........................ 365/185.11, 230.06

(56) References Cited

U.S. PATENT DOCUMENTS

| 4,473,878 | A | | 9/1984 | Zolnowsky et al. |
| 5,901,105 | A | * | 5/1999 | Ong et al. .............. 365/230.06 |
| 6,118,724 | A | | 9/2000 | Higginbottom |
| 6,185,654 | B1 | * | 2/2001 | Van Doren .................... 711/5 |
| 6,826,663 | B2 | * | 11/2004 | Perego et al. ............... 365/120 |

FOREIGN PATENT DOCUMENTS

EP  92306769.8  2/1993

OTHER PUBLICATIONS

PCT Search Report mailed Sep. 30, 2003, International Application No. PCT/US03/07915 (6 pages).

* cited by examiner

*Primary Examiner*—Van Thu Nguyen
*Assistant Examiner*—Tuan T. Nguyen
(74) *Attorney, Agent, or Firm*—Blakely, Sokoloff, Taylor and Zafman

(57) ABSTRACT

A data mask map may be programmed into a storage device in various ways. In one embodiment, the data mask is hardwired into a selection device to reorder either the data mask bits or the data chunks. In another embodiment, a data mask map is retrieved from a location in memory. In still another embodiment, the data mask map is determined through an algorithm.

16 Claims, 12 Drawing Sheets

OBTAINING DATA MASK MAPPING INFORMATION

This application is a continuation of application Ser. No. 10/104,837, entitled "OBTAINING DATA MASK MAPPING INFORMATION," filed Mar. 22, 2002 now U.S. Pat. No. 6,801,459, and assigned to the corporate assignee of the present invention.

BACKGROUND OF THE INVENTION

1. Field of the Invention

The present invention relates generally to the field of computer memory. More particularly, the present invention relates to the field of memory data masks.

2. Description of the Related Art

A typical computer system includes memory. A memory is used to store program code and data needed by that program code. The memory can be included on one or more boards of integrated circuits. Typically, the memory is coupled with a memory controller. The memory controller and the memory communicate over a data bus through pin connections.

Data masks are used to prevent selected data from being overwritten in memory. Accordingly, the memory controller can use data masks to mask specific data to allow partial writes to memory. Data mask bits may be associated with one or more bits of data. The associated data mask blocks writes to specific memory locations and allows writes into other specific memory locations. When a write to memory is performed, the selected data in memory that is masked remains in memory, and the selected data that is not masked is replaced by new data. If the memory controller does not use data masks, partial memory writes may take much longer. For example, the memory controller may approximate a partial write by reading an entire memory area, merging new data into it, and then writing back the entire memory area.

Currently, memory chips implement memory data masks by using separate pins for data mask bits and for data. This can greatly increase pin count. Increased pin count increases cost, package size, and, in some cases, die size. Using separate pins for data mask bits and for data provides no programming of registers with these mappings.

BRIEF DESCRIPTION OF THE DRAWINGS

Embodiments of this invention may be best understood by referring to the following description and accompanying drawings that illustrate such embodiments. For a more complete understanding of the embodiments of this invention, and the advantages thereof, reference is now made to the following descriptions taken in conjunction with the accompanying drawings, in which.

DETAILED DESCRIPTION OF THE INVENTION

In the following description, numerous specific details are set forth to provide a thorough understanding of the embodiments of this invention. However, it is understood that these embodiments may be practiced without these specific details. In other instances, well-known circuits, structures, and techniques have not been shown in detail in order not to obscure the embodiments of this invention.

In various embodiments, the invention may include different ways to program a register with a data mask map. Various embodiments include a hardwiring of a data mask map into a memory controller, a retrieval of a data mask map from a location in memory, and a deduction of a data mask map by a software algorithm. The data mask map may associate data mask bits and data chunks that they mask, where a data chunk may be any defined quantity of data.

Figure 1:
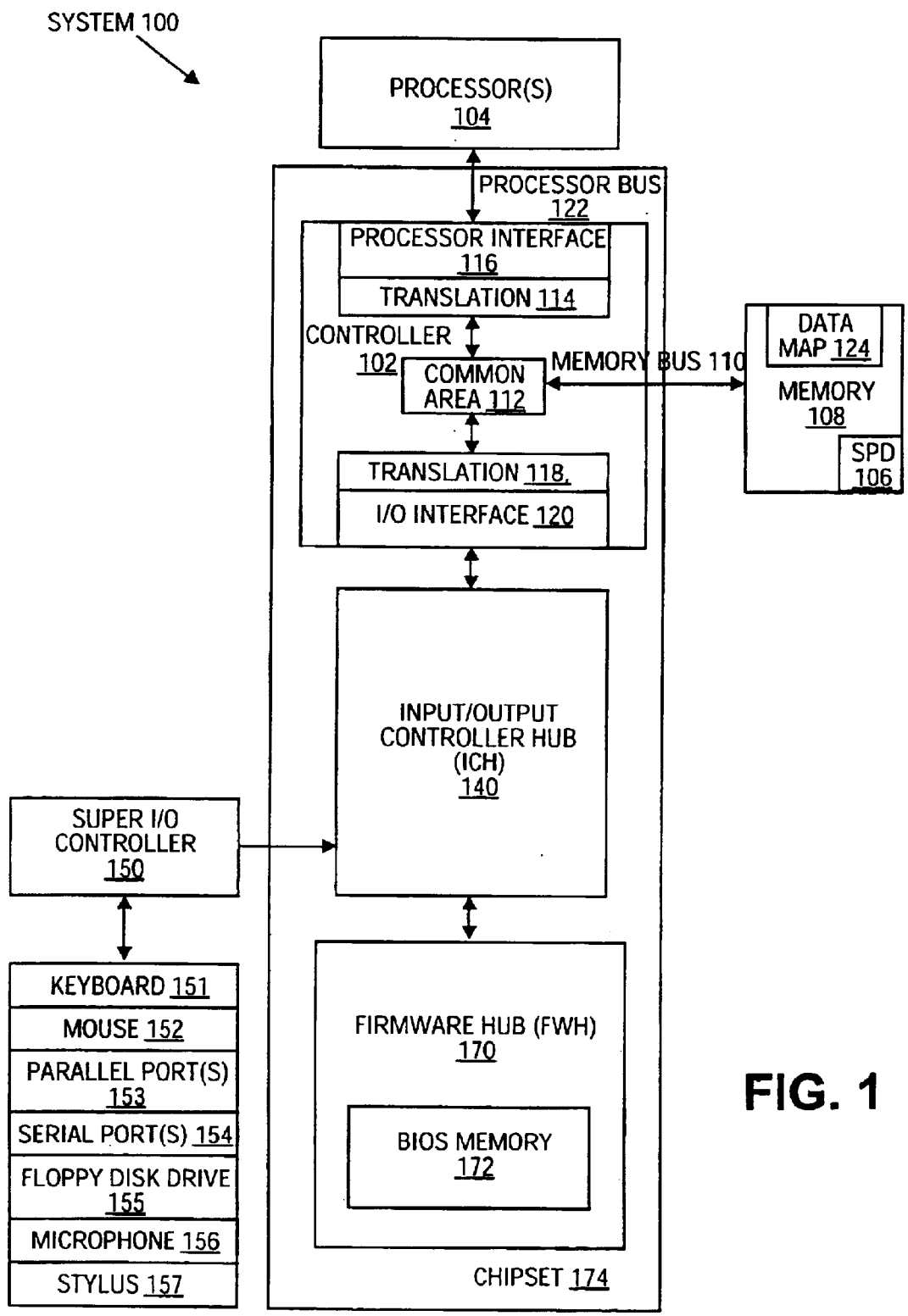
FIG. 1 illustrates an exemplary system comprising a controller, according to one embodiment of this invention.

FIG. 1 illustrates an exemplary system 100 comprising a controller 102, a processor 104, a memory 108, and a memory bus 110 which may include one or more data lines with data masks integrated on them, according to one embodiment of this invention. Although described in the context of system 100, an embodiment of the invention may be implemented in any system comprising any one or more integrated circuits.

Controller 102 may be a part of a chipset 174, for example, also comprising an I/O controller hub (ICH) 140 and firmware hub (FWH) 170. Controller 102, ICH 140, and FWH 170 may each comprise any suitable circuitry and for one embodiment are implemented as separate integrated circuit chips. Chipset 174 for another embodiment may comprise any suitable one or more integrated circuit devices.

Controller 102 may comprise any suitable controller architecture. In various embodiments, system 100 may comprise one or more controllers, any of which may provide an interface, according to one embodiment of this invention. Controller 102 may comprise any suitable interface controllers to provide for any suitable link to memory bus 110 and/or to any suitable device or component in communication with controller 102. Controller 102 for one embodiment may provide suitable arbitration, buffering, and coherency management for each interface.

Controller 102 may be coupled with the processor bus 122 to provide an interface to processor 104 over processor bus 122. Processor 104 may comprise any suitable processor architecture. In various embodiments, computer system 100 may comprise one or more processors 104, any of which may execute a set of instructions that are in accordance with an embodiment of this invention. One or more processors 104 may be combined with controller 102 into a single chip.

In one embodiment, controller 102 may be coupled with ICH 140 to provide access to ICH 140 through a hub interface. ICH 140 may provide an interface to one or more I/O devices or peripheral components for computer system 100. ICH 140 may comprise any suitable interface controllers to provide for any suitable link to memory controller 102 and/or to any suitable device or component in communication with ICH 140. ICH 140 for one embodiment provides suitable arbitration and buffering for each interface.

ICH 140 for one embodiment may provide an interface through a super I/O controller 150 to a keyboard 151, a mouse 152, a microphone 156, a stylus 157, one or more suitable devices, such as a printer for example, through one or more parallel ports 153, one or more suitable devices through one or more serial ports 154, and a floppy disk drive 155. Other embodiments may provide more, fewer, or different devices and interfaces than shown.

ICH 140 may also be coupled with FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 may comprise a basic input/output system (BIOS) memory 172 to store suitable system and/or video BIOS software. BIOS memory 172 may comprise any suitable non-volatile memory, for example, a flash memory. Other embodiments may provide more, fewer, or different devices and interfaces than shown.

Controller 102 may be also coupled with and provide an interface for a memory 108, which may be part of a memory system. Memory 108 may store data and/or code, for example, for use with computer system 100. Memory 108 may comprise any suitable memory, for example, a random access memory ("RAM"), or derivative thereof, or sequential memory. Controller 102 may be coupled with memory via memory bus 110. Memory bus 110 may comprise a bus, which may include data lines, address lines, control lines, or a multiplexed combination of such lines. Data masks integrated on a data bus may eliminate the need for a dedicated data mask bus but may not necessarily eliminate the need for a data mask pin on a coupled device. A combination of data mask bits and data chunks on a pin may reduce the number of bus lines necessary. Also, to map the transferred data mask bits to the transferred data chunks, a data mask map may be implemented that may or may not be fully associative.

In one embodiment, stipulations may allow a briefer data mask map set. For example, it may be a known rule for a system that a certain mask bit will never map to another given data bit. Thus, the data mask map or data mask map set of that system can be lessened by excluding that possibility. As another example, data mask maps may incorporate a stipulation that a one-to-one correspondence exists between a data mask and a data chunk to preserve data integrity. Another stipulation, which may be incorporated in a data mask map or data mask map set is that any data mask map used may be known by both the controller and target (memory). As shown, a data mask map may be simplified through restrictions imposed on/from a memory vendor, yet an embodiment of this invention may also be implemented without such restrictions on a memory vendor.

In one embodiment, controller 102 includes common area 112. Common area 112 may be a circuit in which data from multiple sources connect, for example, a buffer. Transmitting devices, such as processor 104, ICH 140, and the like, may need data reformatted according to a data mask map or data mask map set. Information sent out from processor 104 to common area 112 may require a translation logic 114 and processor interface 116. Translation logic 118 and I/O interface 120 may contribute translation and interfacing for information to be sent out from common area 112 to or through ICH 140.

In the illustrated embodiment of FIG. 1, translation logic 114 and translation 118 are depicted as separate units in system 100. The separate units of translation logic 114 and translation logic 118 may be identical units or different units. In another embodiment, translation logic 114 and translation logic 118 may be a single translation unit coupled with both processor 104 and ICH 140. In still another embodiment, translation logic 114 and translation logic 118 may also be multiplexed into a common area 112 and remapped. The I/O format in translation logic 118 may be different from the CPU format in translation logic 114. The output of either translation logic 114 or translation logic 118 to common area 112 may be the same memory format, such as DRAM format or the like.

Figure 2:
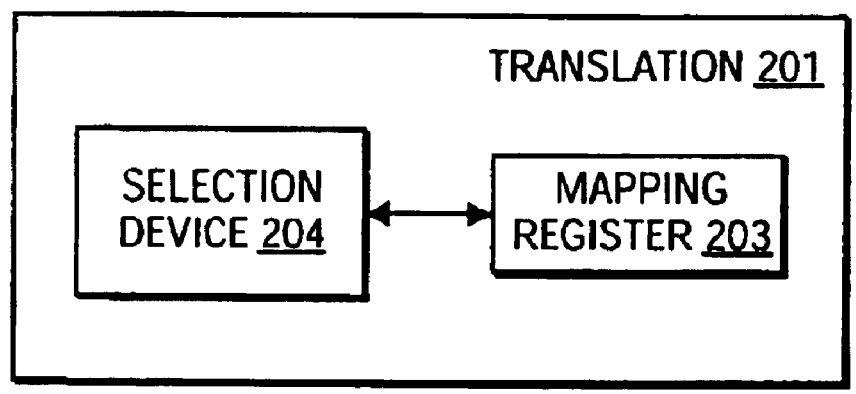
FIG. 2 illustrates a block schematic diagram of a translation logic embodiment, according to one embodiment of this invention.
Figure 4:
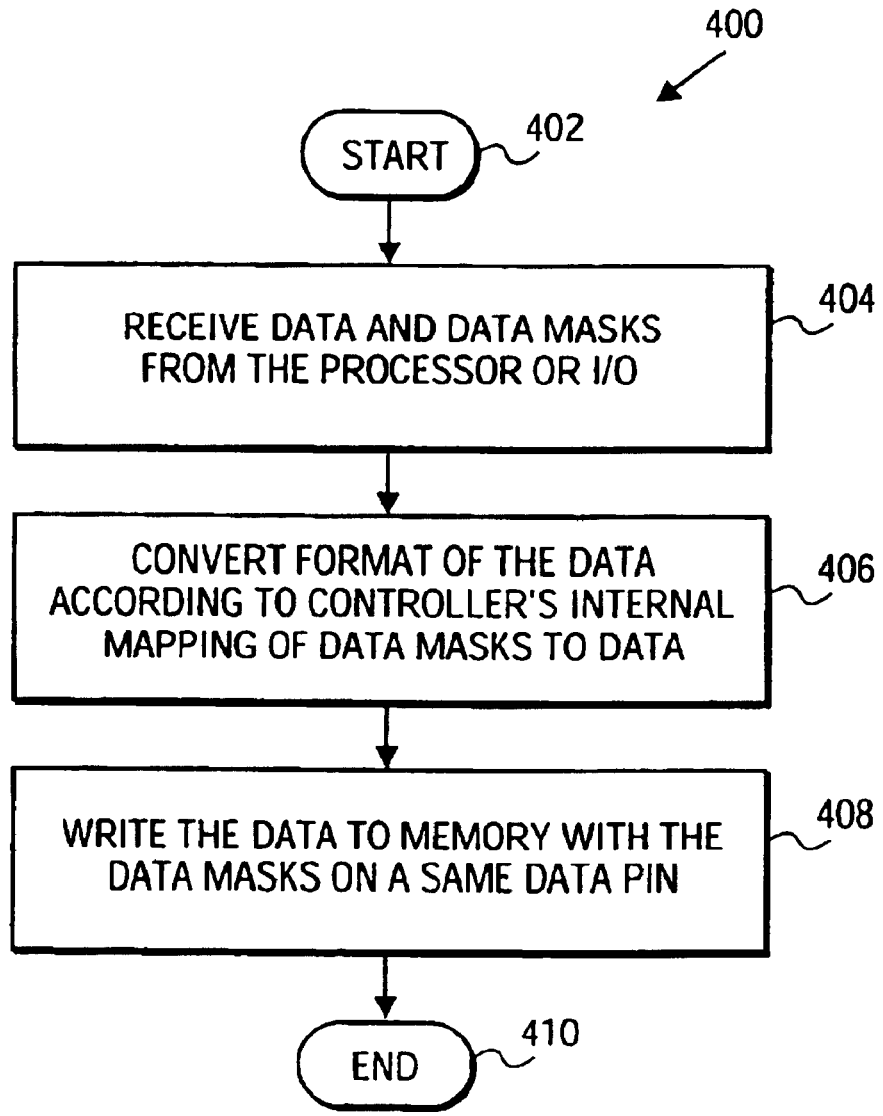
FIG. 4 illustrates a flowchart of a method to provide an interface between a processor and memory, according to one embodiment of this invention.

Translation logic 114 and/or translation logic 118 may include a data mask map or data mask map set, as explained further in FIGS. 2 and 4. The data mask map or data mask map set may match the data mask map or data mask map set in memory 108. In the illustrated embodiment of FIG. 1, memory 108 may include data map 124, which may be stored, for example, in an SPD area of memory, such as SPD 106. In other embodiments, the mapping may be stored in BIOS or object code. Controller 102 may also include fewer or more components and/or a different arrangement of the above listed components.

An embodiment of this invention may be implemented in one or a combination of hardware, firmware, and software. Another embodiment of this invention may be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others. In some embodiments, system 100 may include more components than shown in FIG. 1 while in others it may include less.

FIG. 2 illustrates a block schematic diagram of an example of a translation logic 201, according to one embodiment of this invention. Translation logic 201 may be an embodiment of either translation logic 114 or translation logic 118 or both translation units 114 and 118. The output of translation logic 201 may be sent to common area 112 or memory bus 110, depending whether a common area 112 has been included in the embodiment.

Translation logic 201 may include one or both of a map of data to data mask and a map of data mask to data. This information may be stored in mapping register 203 or other device that may be coupled with selection device 204, which may include, for example, one or more multiplexers. If the data mask map or data mask map set is hardwired as one or more inputs to selection device 204, then, there may be no need for a mapping register 203. Mapping register 203 may be used for a variable or programmable mapping and may be implemented as one or more registers located within memory controller 102. The original source of the map of data to data mask or data mask to data may be an SPD 106 or other storage area of a memory module, BIOS, object code, or other storage area. A memory module may comprise a memory unit and a memory controller. In another embodiment, mapping registers 203 may be located in memory 108 in for example, an erasable programmable read-only memory (eprom) or the like, to contain a register mapping equation. In this embodiment, memory 108 may be programmed to accommodate memory controller 102.

Selection device 204 may also be used to reorder the data mask bits or data bits. For example, selection device 204 may use the data mask map or data mask map set in mapping register 203. In one embodiment, the output of mapping register 203 may be coupled with selection device 204. This way, at design time, the data mask mapping is not required to be known.

Figure 3:
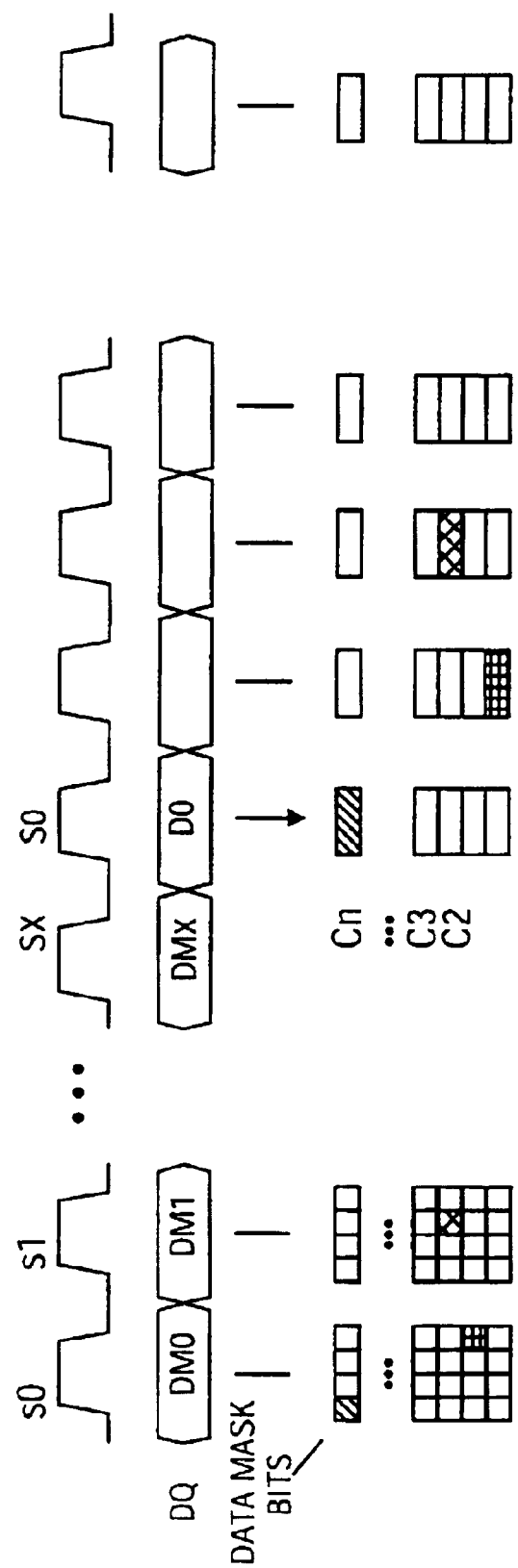
FIG. 3 illustrates a waveform of a write transfer in which data masks are integrated on the data lines, according to one embodiment of this invention.

FIG. 3 illustrates a waveform of a write transfer in which data masks are integrated on the data lines, according to one embodiment of this invention. This may serve as an example of a data chunk and a data mask being sent on a same pin. In illustrating a data chunk and a data mask being sent on a same pin, FIG. 3 also illustrates a data mask map and a division of data into n chunks. In the example of FIG. 3, the times when data mask words may be being transmitted are denoted by s0 through sx, and the times when data words may be being transmitted are denoted by S0–Sy. A word may mean a unit of data that can be moved in a single operation from storage to a processor register. The data mask is represented by DM0–DMx, and the data is represented by D0–Dy. Accordingly, data chunks in FIG. 3 are represented by C0–Cn. Data may be divided into chunks of any size, for example, as small as a single bit or as big as a full transfer of data to be sent. The size of the data chunk, for example, a word, may depend on the system; for example, in a system with a 64-bit bus, the data mask words and the data words may be chosen to be transmitted as 64 bits. The chunk size is defined as the granularity by which data masking is implemented; for example, one data mask bit may mask a byte (8 bits) of data; in which case, a chunk is a byte of data. In this embodiment, a 64-bit data word may be comprised of 8 chunks since each chunk is one byte of data. In some embodiments, data mask bits may mask chunks of data. In one embodiment, the data chunks may be connected in parallel with different devices and data masks may mask which devices receive data chunks.

Further, FIG. 3 illustrates one example of a data mask map. The mapping between the data mask bits and the data may be in any orientation as long as the memory controller and the target (e.g., memory device) agree on the mapping; the data mask mapping schemes of FIG. 3 may serve as examples of some mappings of the data mask bits to the data.

The data masks may be transmitted along with the data in any order during the write transfer. No particular timing relationship may be necessary between the data masks and the data chunks since the data masks are embedded on the same data lines that transmit the data. For example, the data masks may be transmitted before, within, or after the data. Transmitting the data masks before the data, as shown in FIG. 3, permits the memory device to configure the mapping logic before the mapping logic acts on the received data. If the data masks are transmitted after the data, there may be a delay in the write retirement because the data may have to be stored in a buffer to wait for the data mask information.

The number of data mask transfers that may be required may be fixed in a system and dependent on the technology implemented. In one embodiment a maximum number of data mask transfers may be equal to the number of data transfers divided by the number of data chunks in each transfer. This relationship assumes that each data transfer will have the same number of chunks; however, in some embodiments this assumption may not be necessary nor a restriction to this invention.

The number of data mask words in a write transfer may be dependent on the number of data words in the write transfer and the chunk size. For example, if the chunk size is one byte of data and 8 data words are required in a write transfer, there would be a total of 64 chunks in the write transfer if the words were 64 bits. If one data mask bit masks one chunk, 64 data mask bits would be needed for the write transfer. Since 64 data mask bits may compose one data mask word in some systems, one data mask word would be needed in those systems for the write transfer. In the above example, the write transfer would have 8 data words (D0–D8) and 1 data mask word (DM0).

In some situations more than one data mask word may be required in a write transfer. For example, if the chunk size is two bits and 8 data words are required in a write transfer, there would be a total of 256 chunks in the write transfer if the words were 64 bits. If one data mask bit masks one chunk, then 256 data mask bits would be needed for the write transfer. If 64 data mask bits compose one data mask word in this embodiment, 4 data mask words would be needed for the write transfer. In the above example, the write transfer would have 8 data words and 4 data mask words.

In the example of the previous paragraph where the chunk size is two bits, the number of data chunks in a word would be 32; therefore, in FIG. 3, the data chunks may be numbered C0–C31. The 4 data mask words in the write transfer may be numbered DM0–DM3 and the 8 data words in the write transfer may be numbered D0–D7. In FIG. 3, using an example data mask mapping scheme, the checkered data mask bit of DM0 masks data chunk Cn of D0. The dotted data mask bit of DM0 masks C0 of D1 and the diagonally squared data mask bit of DM1 masks C2 of D2.

The mapping schemes have a one to one relationship to indicate that one data mask bit may be associated with one chunk. Since there may be n data mask bits that can be mapped to the n data chunks, it may lead to a total of $n^2$ possible mapping schemes. For example, if 8 data word transfers with 64 data chunks require 64 data mask bits, 4,096 possible mapping schemes may exist. A memory rank, which is one of one or more blocks of memory coupled with the same chip select, may have its own mapping scheme and a memory module may have one or more memory ranks. Therefore, one or more mapping schemes may be needed to perform the correct data mask mapping in each memory module.

FIG. 4 illustrates a flowchart 400 that exemplifies one method for the controller to provide an interface between a processor and memory, in which the data and data mask use the same pin to communicate to memory, in accordance with one embodiment of the present invention. Block 402 starts the method. Next, in block 404, the controller may receive data and data masks from a processor or from I/O. Either the processor or I/O may give the controller information in a format that may need to be formatted for memory. The controller may have an internal mapping of data masks to data; thus, in block 406, the controller may be able to convert the data's format according to its mapping of data to data masks. In one embodiment, the controller may convert the data's format into a data line with data masks integrated. Next, in block 408, the controller may write the data line with data masks integrated to memory. Finally, in block 410, the controller may end this method. To transfer data and/or data masks from memory to processor or I/O, the reverse process involves conversion from one integrated line to two lines of data mask bits and data chunks instead of from two lines to one line of data and data masks.

Figure 5:
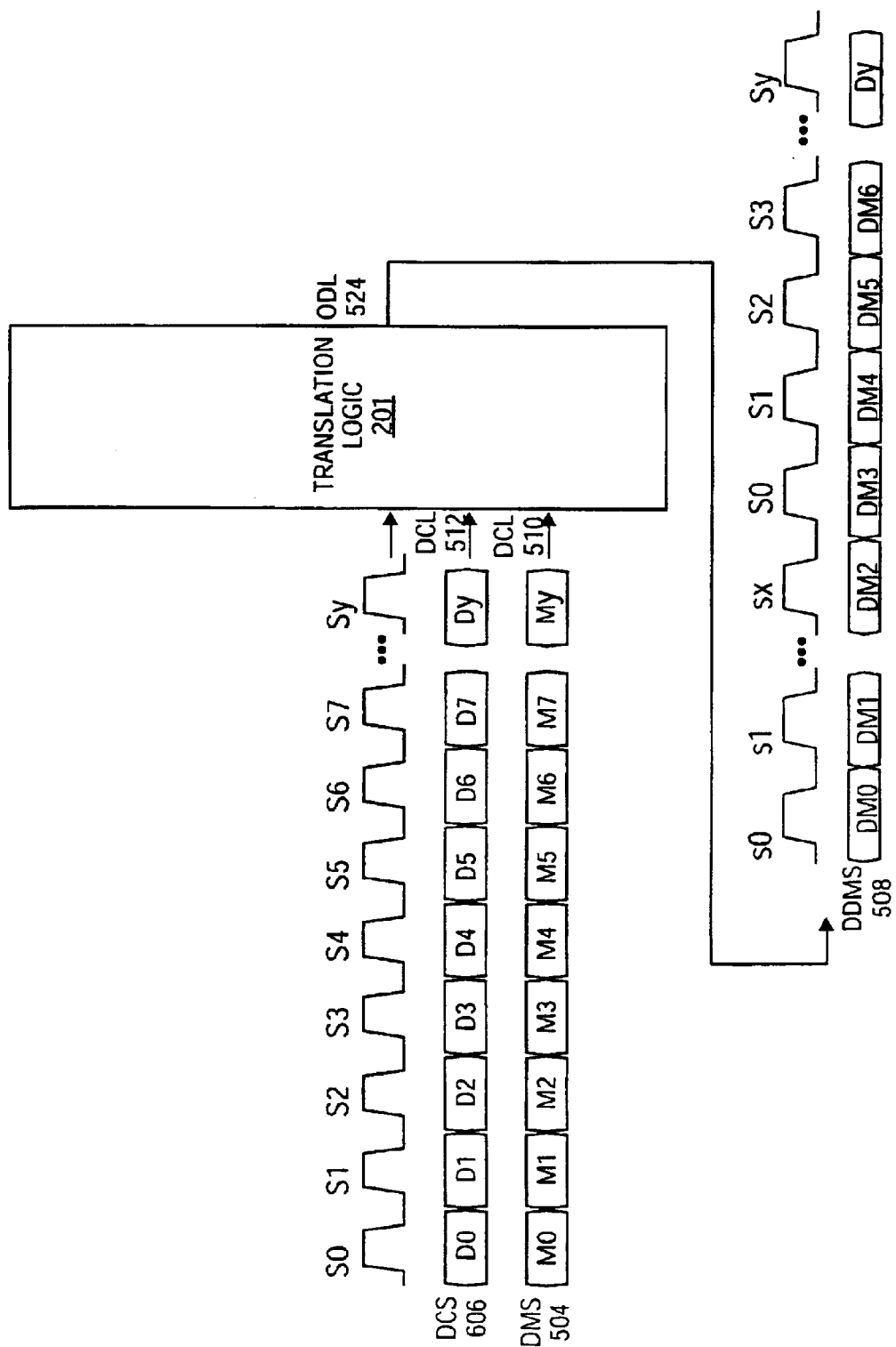
FIG. 5 illustrates a block schematic diagram of translation logic to integrate a data mask line onto a data chunk line, according to one embodiment of this invention.

FIG. 5 illustrates a block schematic diagram using translation logic 201 to integrate a data mask stream 504 of one or more data mask bits with a data chunk stream 506 of one or more data chunks, according to one embodiment of this invention. On the left side of FIG. 5, data mask stream 504 and data chunk stream 506 may be sent at the same spatial time, for example, by the processor. Translation logic 201 may be able to format the data mask stream 504 and data chunk stream 506 into memory-recognizable format. S0–Sy may represent system clocks. Data chunk stream 506 may include data divided into one or more chunks D0–Dy, per FIG. 3. Data mask stream 504 may include one or more data mask bits M0–My associated with one or more data chunks D0–Dy. Data chunk stream 506 and data mask stream 504 may feed into translation logic 201 via different lines, such as data mask line 510 and data chunk line 512.

The output of translation logic 201 of FIG. 5 may be a data and data mask stream 508, a data chunk stream with associated data masks integrated. The order in which the data chunks and data masks are sent on an output data line 524 may differ in different embodiments. In some embodiments, sending the data masks first reduces storage costs because the data chunks may be processed based on the data masks as the data arrives. In this embodiment, the data masks are sent first, during clocks s0–sx; then, the data chunks are sent during clocks S0–Sy. In one embodiment, data may travel between controller 102 and memory 108 in a format such as that shown by data and data mask stream 508 because an embodiment of this invention may eliminate the need for one or more data mask lines between the controller 102 and the memory 108. Yet, between the controller 102 and processor 104 or the controller 102 and ICH 140, the data may travel in a combination of data chunk line 506 and data mask line 504.

Figure 6:
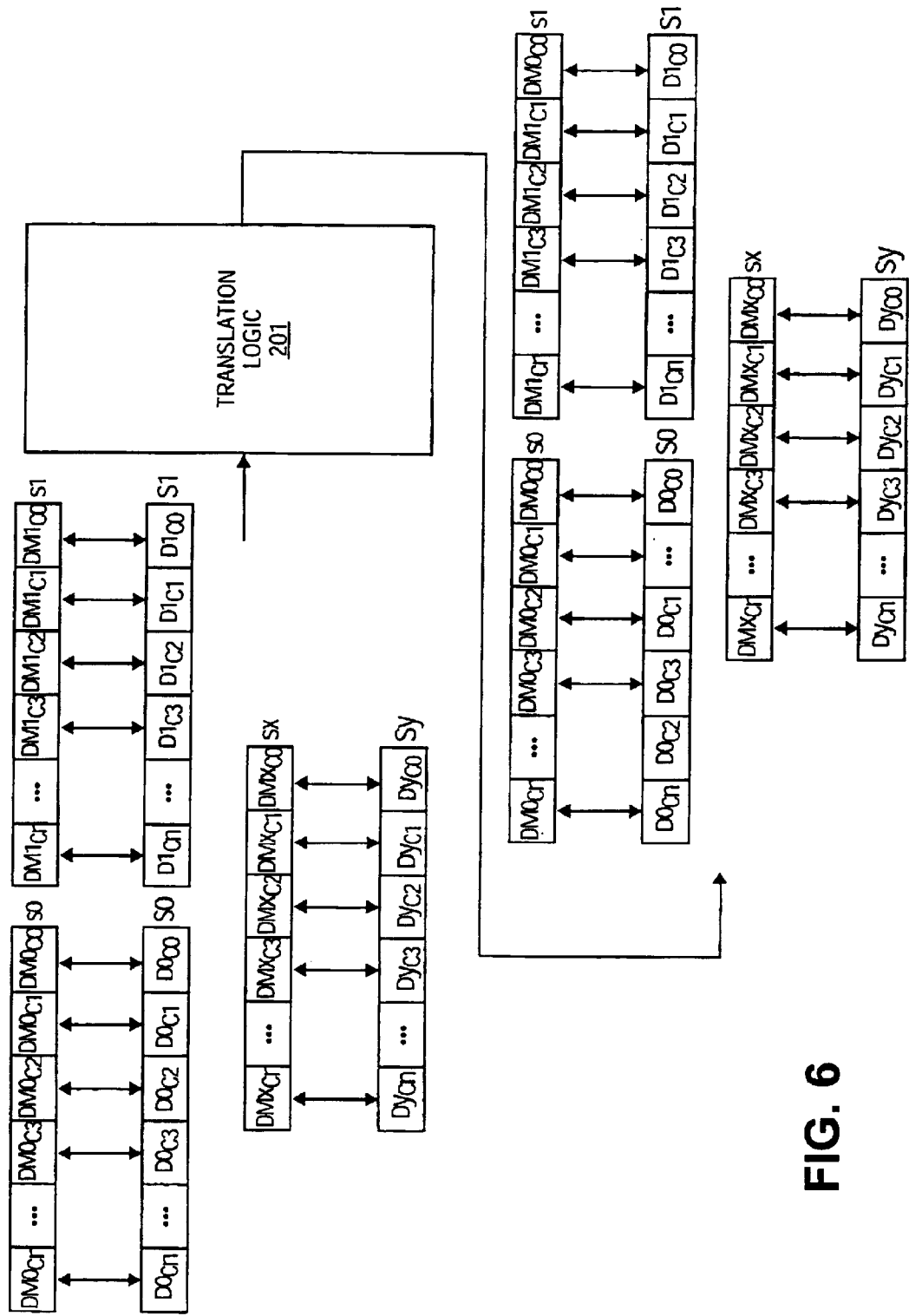
FIG. 6 illustrates a block schematic diagram of translation logic to change a mapping of data masks to data chunks, according to one embodiment of this invention.

FIG. 6 illustrates a block schematic diagram of an example of translation logic 201 to change a mapping of data masks to data chunks, according to one embodiment of this invention. As shown as input to translation logic 201, data masks $DM0_{Cn}$–$DM0_{C0}$ are associated with data chunks $D0_{Cn}$–$D0_{C0}$ during time s0=S0, data masks $DM1_{Cn}$–$DM1_{C0}$ are associated with data chunks $D1_{Cn}$–$D1_{C0}$ during time s1=S1, data masks $DMx_{Cn}$–$DMx_{C0}$ are associated with data chunks $Dy_{Cn}$–$Dy_{C0}$ during time sx=Sy. Translation logic 201 may be able to change the associations between data masks and data chunks. In the illustrated embodiment, translation logic 201 may be able to reverse the order of data chunks associated with data masks $DM0_{Cn}$–$DM0_{C0}$ during clock s0. As shown as output from translation logic 201, data masks $DM0_{Cn}$–$DM0_{C0}$ are associated with data chunks $D0_{C0}$–$D0_{Cn}$ during time s0=S0, data masks $DM1_{Cn}$–$DM1_{C0}$ are associated with data chunks $D1_{Cn}$–$D1_{C0}$ during time s1=S1, data masks $DMx_{Cn}$–$DMx_{C0}$ are associated with data chunks $Dy_{Cn}$–$Dy_{C0}$ during time sx=Sy. There are many possibilities of associating the data mask bits and data chunks.

Translation logic may include multiplexers or other methods of reordering information to match a mapping. So that the data masks may be able to prevent the correctly corresponding data chunks from being overwritten in memory, the hardware in the memory controller may be programmed once a mapping of data masks to data chunks is determined. One embodiment of programming a mapping into hardware of the memory controller may be using a register to program the hardware, as described in FIG. 2 with mapping register 203 and selection device 204.

Figure 7:
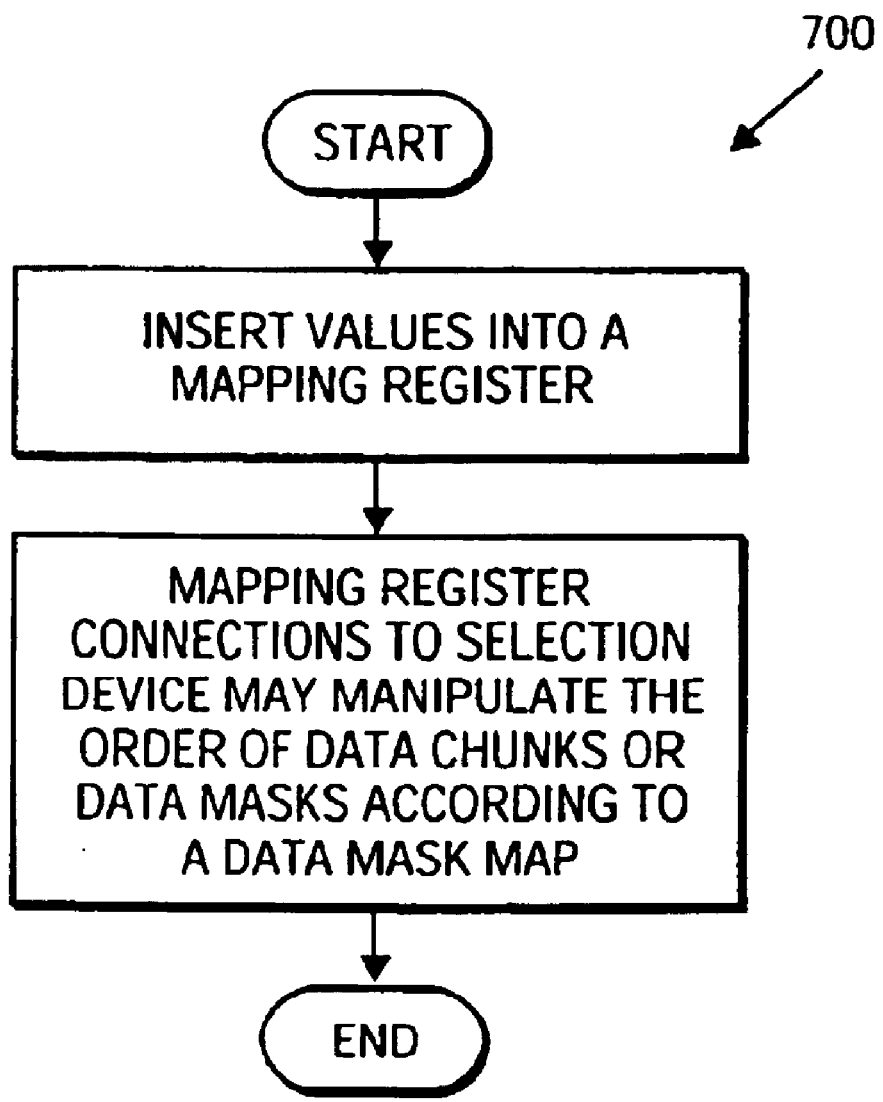
FIG. 7 illustrates a flowchart of a method for a memory controller to program itself, according to one embodiment of this invention.

FIG. 7 illustrates a flowchart of a method for a memory controller to program itself, according to one embodiment of this invention. In block 702, a known mapping of data masks and data chunks may be inserted into a mapping register 203. One or more mapping registers may be incorporated into this method. These values may be inserted by hardware via software or firmware, such as BIOS. In one embodiment, in block 704, mapping register 203 may have connections to selection device 204 to manipulate the order of data chunks or data masks according to a data mask map or data mask map set. In block 702, a known data mask map or data mask map set may also be programmed into a circuit or the like with the mapping values to maintain communication with memory 108 that maps data masks to data chunks in such a way to prevent the correctly corresponding data chunks from being overwritten in memory.

Figure 8:
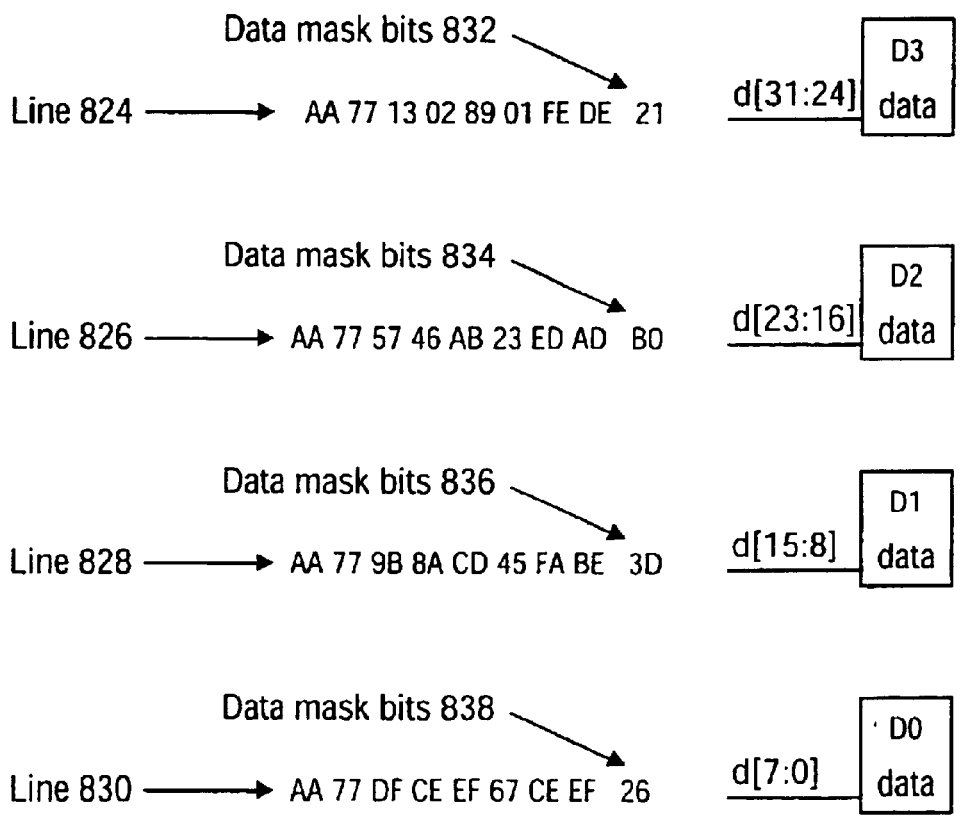
FIG. 8 illustrates a table and block schematic of specific value examples of data mask bits masking specific examples of data chunks, according to one embodiment of this invention.

FIG. 8 illustrates a table and block schematic of specific value examples of data mask bits masking specific examples of data chunks and whose data mask map or data mask map set may be programmed into a memory controller, according to embodiments of the present invention. Column 802 contains data that may be used in a computer system, while column 804 contains data masks to prevent selected data from overwriting memory. In this example, each data mask bit masks two alphanumerics of the data or one byte. Other allocations of data mask bits to data may also be used. In row 808, column 804, the lowest four bits of the data mask bits may be "A" which is "1010" in binary, which means data mask bits are asserted for data chunks "DE" and "BE". In row 810, column 804, the data mask bits are "1", or "0001", which mask data chunk "CE". In row 812, column 804, the data mask bits are "3", or "0011", which mask data chunks "45" and "67". In row 814, column 804, the data mask bits are "2", or "0010", which masks data chunks "CD". In row 816, column 804, the data mask bits are "6", or "0110", which masks data chunks "46" and "8A". In row 818, column 804, the data mask bits are "F", or "1111", which masks data chunks "13", "57", "9B", and "DF". In row 820, column 804, the data mask bits are "0", which masks no data chunks. In row 820, column 804, the data mask bits are "4", or "0100" which masks data chunk "AA".

The data transfers are 4 bytes long in this example, and the data chunks are 1 byte long. The data chunks' size and the order of data elements and lines chosen may vary and still accomplish the purpose of transmitting both data chunks and their respective data masks integrated on the same line or lines. These lines transfer values that may be ready to be transmitted to memory from the memory controller. On line 824, both data elements and data masks are sent on the same line. The data elements sent in this example are the first byte of each data chunk from rows 806–822, column 802. Sent first on line 824, though, are data mask bits 832. The order of data mask bits versus data chunks chosen also may vary and still accomplish the purpose of an embodiment of this invention, but for convenience, one option has been chosen to be displayed in this figure. The mask bits sent on line 824 are "21" in hexadecimal, or "00100001" in binary. On the other three data lines 826, 828, and 830 to devices D2, D1, and D0, respectively, the second, third, and fourth bytes of the data from column 802 are sent. Their respective data mask bits 834, 836, and 838 equal "B0", "3D", and "26", or "10110000", "00111101", and "00100110", in this embodiment. The above mask bits that are transmitted may correspond to masking the byte values "13", "DE", "AA", "57", "46", "9B", "8A", "CD", "45", "BE", "DF", "67", and "CE", as indicated by rows 808–822, columns 802 and 804.

Figure 9A:
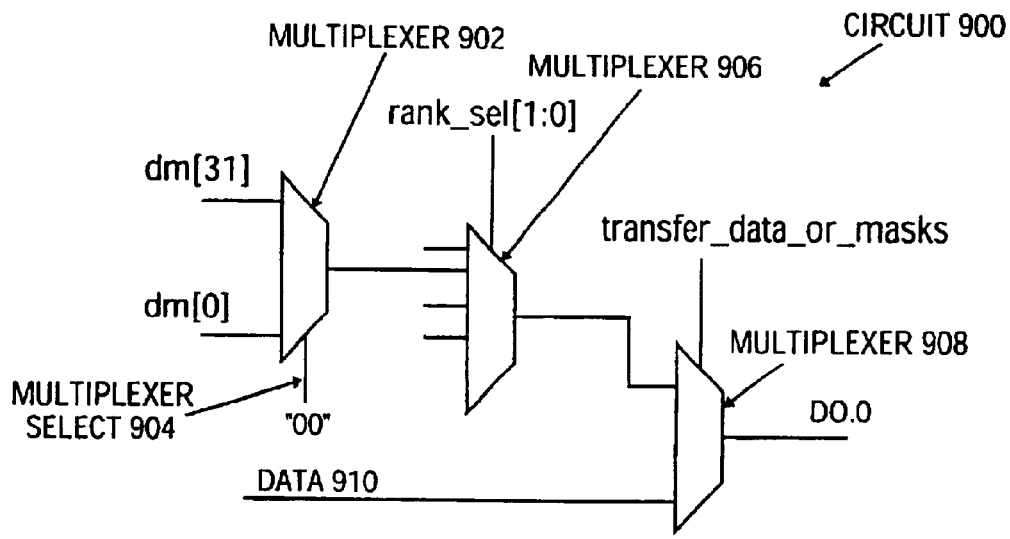
FIG. 9 illustrates two example circuits of multiplexers to select elements to transmit multiple bits to a device, according to one embodiment of this invention.
Figure 9B:
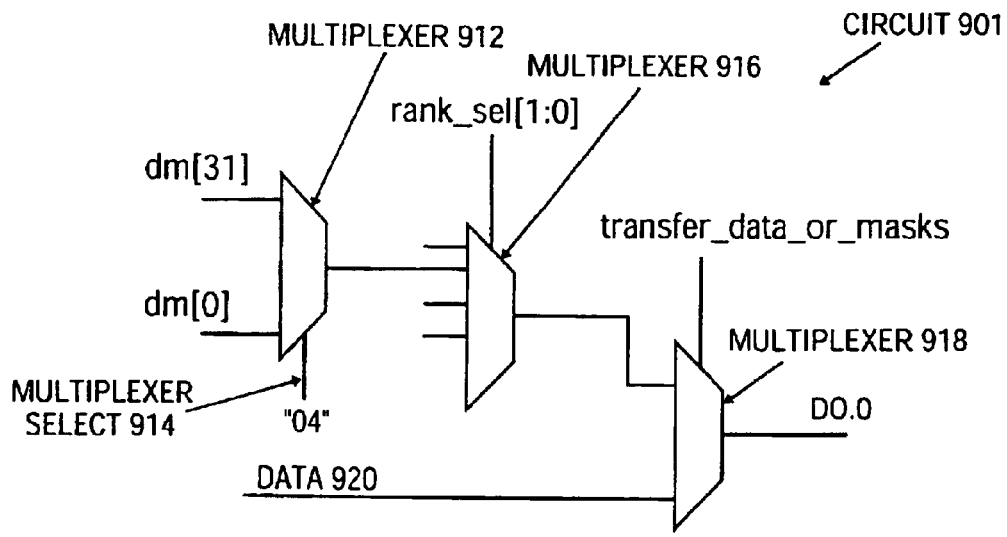

Data lines 824, 826, 828, 830 may be used in an embodiment of a memory connection, such as memory bus 110 of FIG. 1. A possible implementation of memory bus 110 may comprise a circuit of one or more multiplexers whose outputs may be coupled with one bit per output device. FIG. 9 illustrates two example circuits of multiplexers to select elements to transmit multiple bits to a device, according to one embodiment of this invention. Circuit 900 illustrates a circuit that outputs bit 0 to device 0 via line D0.0 which corresponds to bit 0 of device D0 of FIG. 8. In this embodiment, there are 32 bits total of data mask bits to transfer, but in other embodiments, that number may vary. Data mask bits 0 to 31 connect to multiplexer 902. Multiplexer select 904 may indicate which data mask bit may be appropriate to send based on a mapping of data mask bits to data chunks. The multiplexer select 904 in this embodiment corresponds to the mapping between data mask bits and data chunks for device D0, bit 0, and equals 00 in hex or 00000000 in binary. Multiplexer select 904 may be hardwired to indicate that value. In one embodiment, binary zeros may be connected to ground and binary ones may be connected to power to hardwire a mapping. In another embodiment, multiplexer select 904 may be connected to a register such as mapping register 203 in FIG. 2.

Multiplexer 906 may select to which memory rank the data is written. Memory rank may also reduce the number of selections that may be required in a circuit if the mapping is equivalent among any memory ranks. Multiplexer 908 may control whether a data chunk or a data mask bit may be transferred on line D0.0. One data input to multiplexer 908 may be data input 910. Many other embodiments exist to select data chunk, data mask, rank, and the like to be transferred. Circuit 901 may be analogous to circuit 900, with multiplexers 912, 916, 918 and lines 914, 920 corresponding to multiplexers 902, 906, 908 and lines 904, 910, respectively, and with the exception that the target data output may connect to device D0 bit 1 on line D0.1. A circuit including circuit 900 and 910 and optionally additional circuits to additional device bits may allow a series of multiplexer to be able to load both at least one data mask bit and at least one data chunk on the same line to feed to memory, as described further in FIG. 10.

Figure 10:
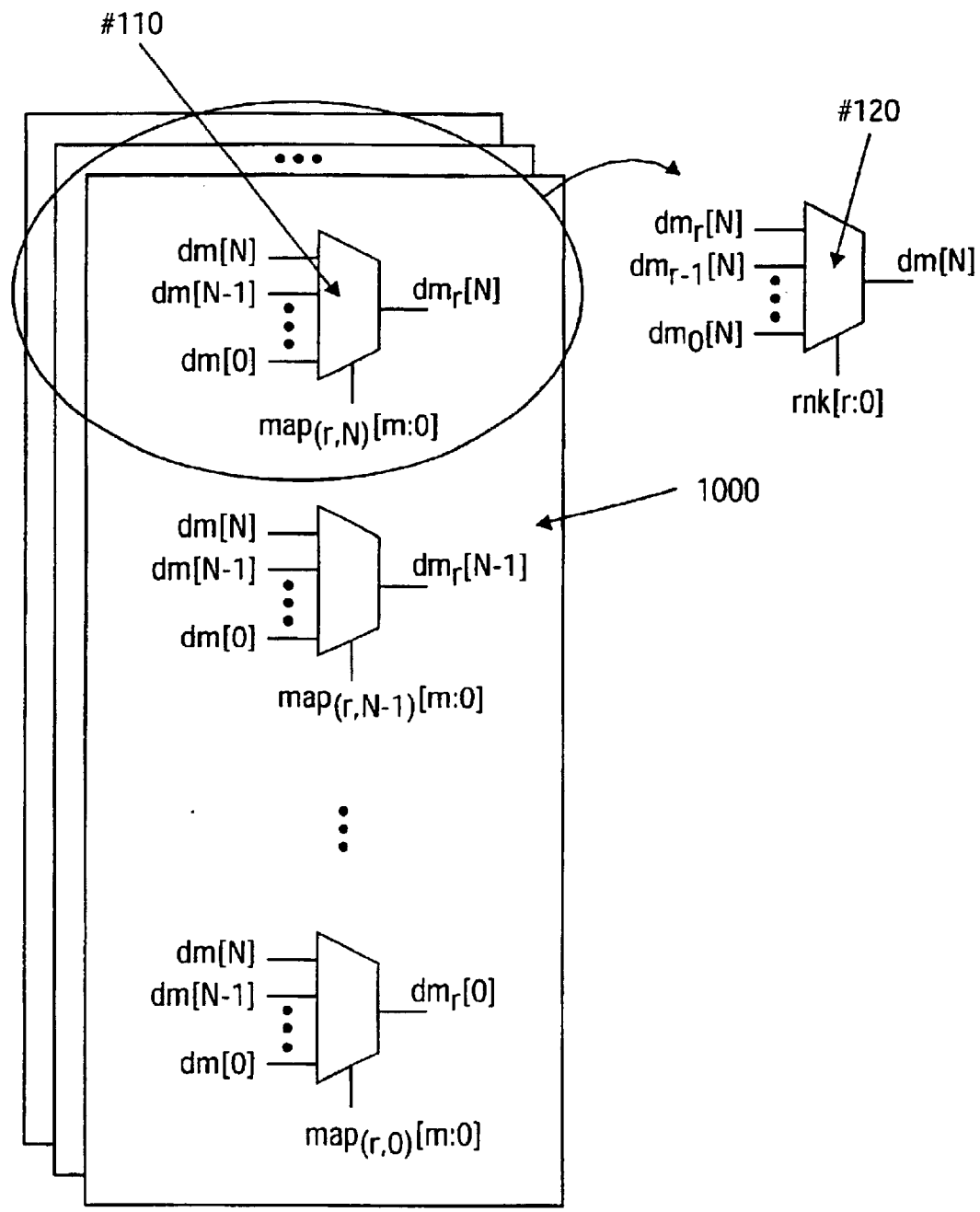
FIG. 10 illustrates an array comprising multiplexers to select a mapping between data mask bits and data chunks, according to one embodiment of this invention.

FIG. 10 illustrates an array 1000 comprising multiplexers to select a mapping between data mask bits and data chunks, according to an embodiment of this invention. In one embodiment, these multiplexers are located in controller 102. The inputs may be data mask bits; the outputs may be data mask bits selected from the input data mask bits according to the applicable data mask map. The notation dm$_r$[N] indicates the selected output data mask bit; r may indicate the rank, and N may indicate which bit in the data mask. FIG. 10 shows multiple multiplexer arrays because each memory rank may have a different mapping and be controlled by a different array. If each rank has the same mapping, then in one embodiment, the number of N:1 multiplexers may be less than the full number of memory ranks. Instead of each bit having an N:1 multiplexer, one multiplexer with an output of N:1 and an additional r:1 multiplexer to select which rank to access may suffice. Although not shown in FIG. 10, the mapping of data mask bits to data chunks may or may not infer which memory location may be intended. In one embodiment, the mapping does not infer the memory location and another chip may receive the data chunks and map locations for that device. If another chip is used, then mapping, storage, and/or generation logic can be minimized with tailored rules or other knowledge-based inputs implemented to accommodate a memory location scheme.

In the above embodiment, the circuits in FIG. 9 and 10 have shown that a memory controller may be programmed with a data mask map or data mask map set through multiplexer select connections. One embodiment of programming the memory controller ordering may be to hardwire multiplexer selects, such as multiplexer select 904 or multiplexer select 914, to ground and/or power. Another embodiment to program the memory controller with a data mask map or data mask map set may be to retrieve data mask map data from a location in memory, and use a software algorithm to produce a data mask map or data mask map set.

Figure 11:
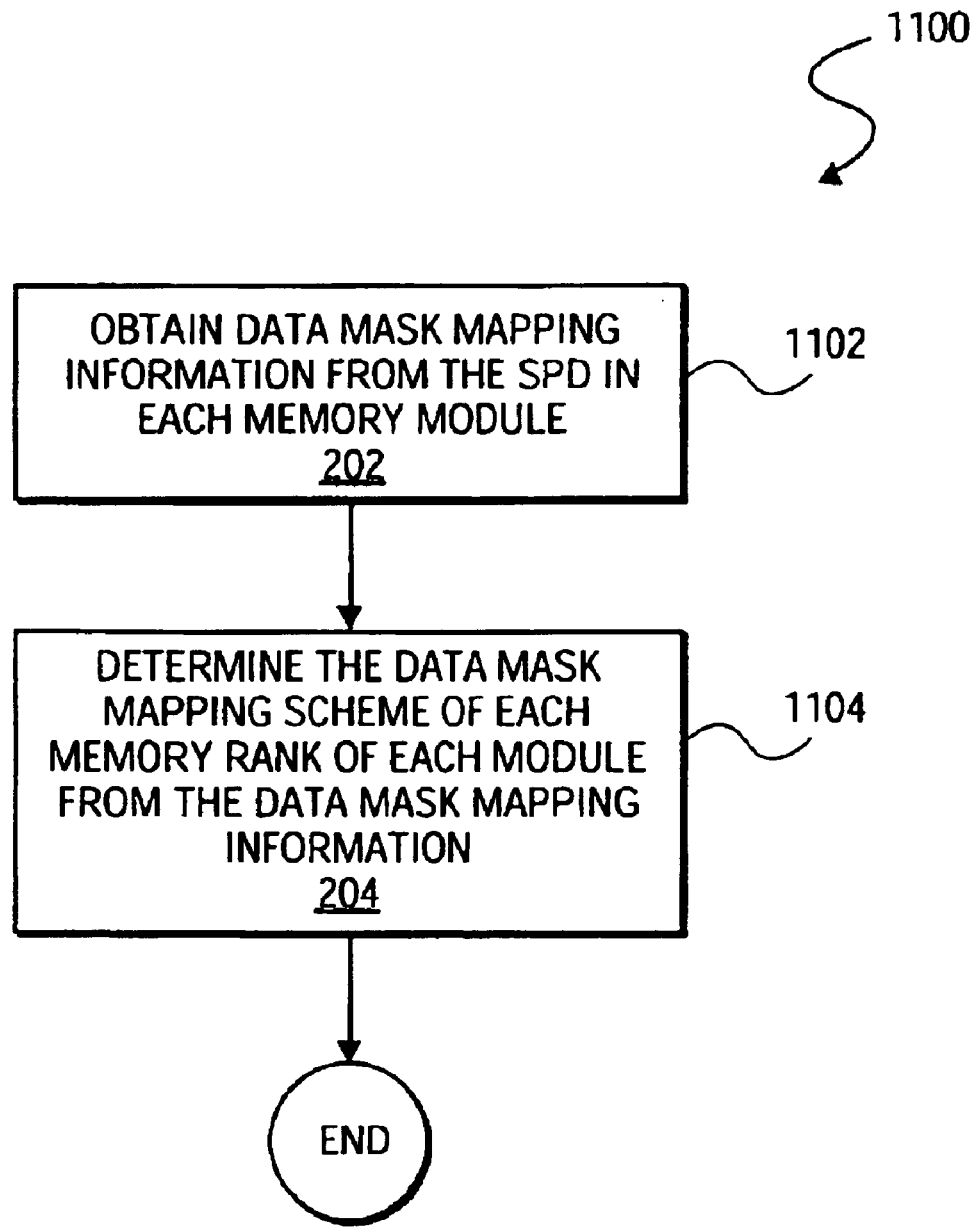
FIG. 11 illustrates a flow diagram of a method to obtain data mask mapping information from a serial presence detect (SPD) in a memory module, according to one embodiment of this invention.

FIG. 11 illustrates a flow diagram of a method to obtain data mask mapping information from an SPD 106 in a memory module, according to embodiments of the present invention. The SPD 106 may include information stored in an electrically erasable programmable read-only memory chip on a synchronous dynamic random access memory module for the BIOS to retrieve such information as the module's size, data width, speed, and voltage. Because the BIOS may use this information to configure the memory properly for maximum reliability and performance, the BIOS may also benefit from a data mask map or data mask map set stored in the SPD 106 to program the memory controller. The SPD 106 for this embodiment may include a storage area to hold a data mask map or data mask map set in an area of memory such as data map 124 of FIG. 1.

Method 1100 of FIG. 11 commences by obtaining data mask mapping information from an SPD 106 in each memory module, at process block 1102. Each memory module in the system may comprise one or more memory ranks and each of the memory ranks may have a different data mask mapping scheme.

The data mask mapping scheme of a memory rank of a module may be determined from the data mask mapping information, at process block 1104. In one embodiment, the data mask mapping information may be the data mask mapping schemes of each memory rank. In another embodiment, the data mask mapping information obtained from each memory module may comprise an indicator of the mapping schemes of each memory module. An indicator of the mapping schemes may be a word, such as "Vendor A" or a number, such as "4865". The word or number may be associated with the mapping schemes of a memory module; therefore, when each indicator is received it may indicate the data mask mapping scheme of each memory rank of the memory module. For example, receiving "Vendor A" may indicate that one rank of memory of a memory module has mapping scheme X, another memory rank of the same memory module has mapping scheme Y, and another memory rank of the same memory module has mapping scheme Z.

After the data mask mapping schemes are obtained, the memory controller may be programmed with the mapping schemes. Obtaining the data mask mapping information from the SPD 106 may provide memory vendors the flexibility of defining their own mapping, which may ease their testing methods or layout constraints. The memory manufacturer may exclude explicit memory mapping information in the SPD 106, relying instead on a published map corresponding to the vendor's SPD information.

Figure 12:
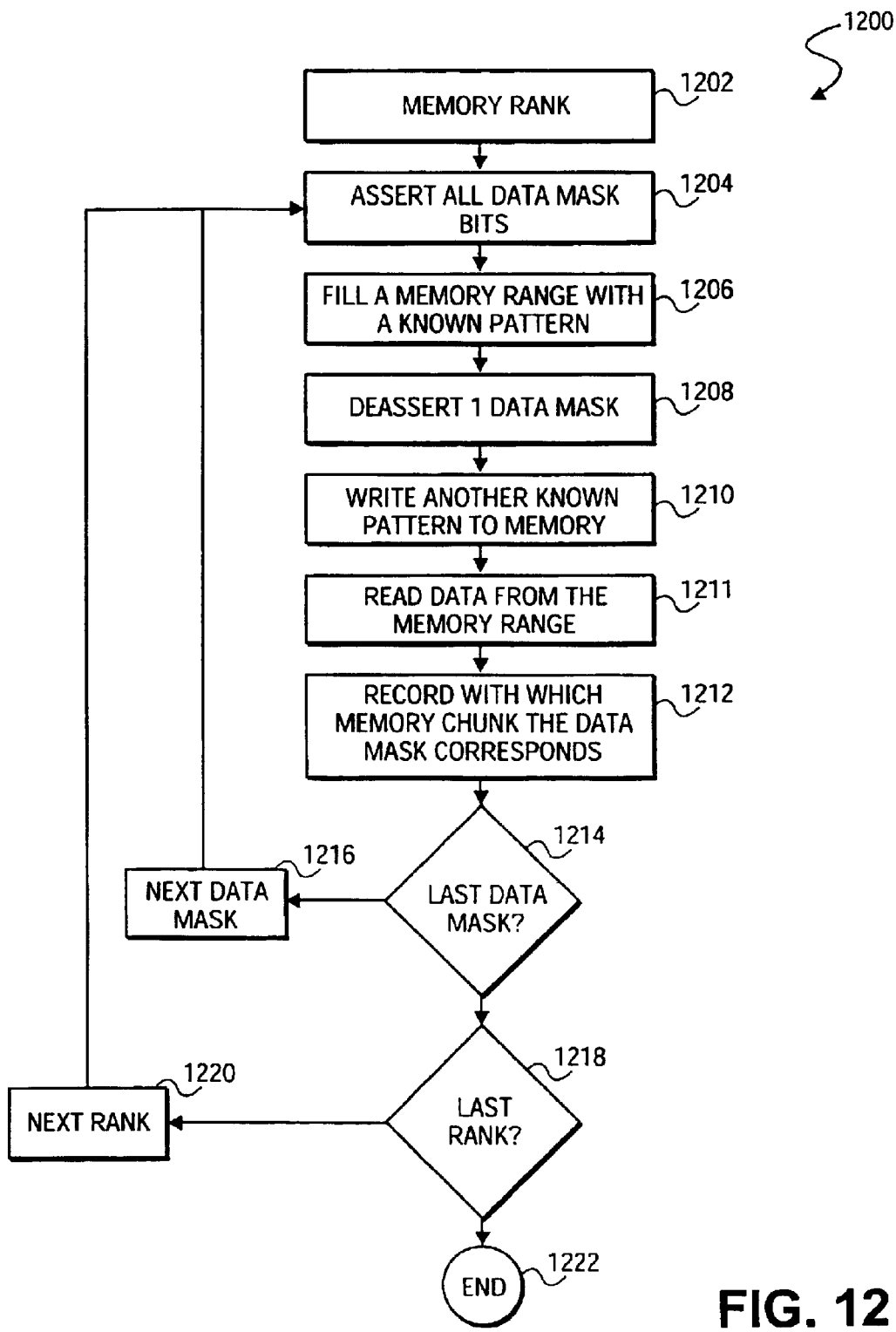
FIG. 12 illustrates a flow diagram of a method for determining a data mask mapping scheme of each memory rank of a memory module, according to one embodiment of this invention.

In addition to hardwiring and memory location retrieval, another embodiment to program the memory controller with a data mask map or data mask map set may be to deduce the data mask map or set by using a software algorithm to investigate a memory vendor's memory characteristics. FIG. 12 illustrates a flow diagram of a method for determining a data mask map of each memory rank of a memory module, according to one embodiment of this invention. Different embodiments exist per methods to determine the data mask map or data mask map set; therefore, the following embodiment serves as an example of one method. Memory modules may comprise one or more memory ranks and each of the memory ranks may have a different data mask map or data mask map set; therefore, each of the memory ranks of each memory module may need to be examined to determine the data mask map or set.

Method 1200 of FIG. 12 commences by selecting a first memory rank of a memory module, at process block 1202. All data mask bits are asserted in process block 1204, and a first write transfer may be performed to fill a range of memory in the selected memory rank with a known first test data pattern, at process block 1206. For example, a write transfer that may be the width of the maximum data transfer size may be performed with a data pattern of all 1's, and because the asserted data mask bits may indicate that its associated data chunk may not be masked, the range of memory may be filled with the pattern of 1's. Depending on the convention, sometimes a deasserted data mask bit may indicate that its associated data chunk may be masked. The algorithm may adopt either convention, and in this embodiment, an asserted data mask bit may indicate that its associated data chunk may not be masked and a deasserted data mask bit may indicate its associated data chunk may be masked.

A test data mask pattern including one data mask bit which may be asserted may be written in process block 1208. A second write transfer may be performed to fill a range of memory in the selected memory rank with a second known data pattern at process block 1210. For example, a write transfer the width of the maximum data transfer size may be performed with a data pattern of all 0's, and since one data mask bit may be asserted, one chunk of data of the range of memory may be filled with the pattern of 0's and the rest of the chunks will be masked and so will remain 1's. In the above example, the known pattern of 0's serves as a "tag" to identify the modified chunk in the range of memory. In one embodiment, a second test data pattern may be written in process block 1210.

The "tag" may be used to identify the data chunk with which the asserted data mask bit may be associated. The modified chunk of data may be identified in several ways; the following is an example of one embodiment. A read request of the data in the range of memory may be performed in block 1211. The location of the modified chunk within the data pattern may be determined by comparing the chunks of the read data to the chunks of the first known data pattern that was written in process block 1206; in the previous example, a pattern of all 1's was written. When a mismatch occurs, the location of the modified chunk may be identified.

The method chosen to compare the chunks of the read data to the chunks of the first known data pattern that was written in process block 1206 depends on the data patterns used. One method may be to XOR the read data with the first known data pattern that was written in process block 1206. Logically shift the result of the XOR operation by the chunk size until the chunk matches the "tag" used in process block 1208, which in the previous example the "tag" was all 0's. The number of logical shifts performed indicates the location of the modified chunk.

When the location of the modified chunk has been identified, the mapping of the data mask bit selected in process block 1208 may be known. For example, if the selected data mask bit is the first data mask bit in the data mask bit pattern used in process block 1208 and if the modified chunk is the fifth chunk of the read data, the first data mask bit masks to the fifth data chunk. The mapping of the data mask bit selected in process block 1208 may be recorded, at process block 1210. The mapping of the other data mask bits may be determined in a similar manner by looping through blocks 1204–1216 until the last data chunk has been used, as determined at block 1214. Blocks 1218 and 1220 may then be used to repeat the process for the remaining ranks. When the last rank has been processed as determined at block 1218, the process may end at block 1222. The mapping scheme thus determined may be stored in controller 102 as previously described.

The foregoing description is to be considered in all respects only as illustrated and not restrictive in the scope of embodiments of this invention. Variations will occur to those of skill in the art. This invention may be embodied in other specific forms without departing from its spirit or central characteristics. All changes which come within the meaning and range of the equivalency of the claims are to be embraced within our scope. Variations are intended to be included in embodiments of this invention, which is limited only by the spirit and scope of the appended claims.

We claim:

1. An apparatus, comprising:
   a memory controller having a hardwired selection device to program the memory controller with a data mask mapping scheme, the data mask mapping scheme to associate at least one data mask bit with at least one data chunk in a memory module; and
   an output to be coupled to the memory module.

2. The apparatus of claim 1, wherein the hardwired selection device is to receive the at least one data mask bit and at least a portion of the at least one data chunk.

3. The apparatus of claim 2, wherein the hardwired selection device is to select one of the at least one data mask bit to be associated with one of the at least one data chunk according to the data mask mapping scheme.

4. The apparatus of claim 1, wherein the hardwired selection device is to implement the data mask mapping scheme.

5. An apparatus, comprising:
   a memory controller including a storage device having information to indicate a data mask mapping scheme for the memory controller; and
   an output coupled to the memory module.

6. The apparatus of claim 5, wherein the storage device is loadable with the data mask map by software.

7. The apparatus of claim 5, wherein the storage device is loadable with the data mask map by BIOS.

8. The apparatus of claim 5, wherein the storage device is to include the information at manufacture time.

9. The apparatus of claim 5, wherein the information is to include at least one indicator to indicate the data mask mapping scheme.

10. The apparatus of claim 5, wherein the information is to include the data mask mapping scheme.

11. A system, comprising:
- a memory module to use at least one data mask mapping scheme to associate at least one data mask bit with at least one data chunk;
- a memory controller coupled with the memory module, the memory controller to be programmed with the at least one data mask mapping scheme used in the memory module.

12. The system of claim 11, wherein the memory module includes a first and a second memory rank to use at least one of the at least one data mask mapping scheme.

13. The system of claim 12, wherein the first memory rank is to use a different data mask mapping scheme than the second memory rank.

14. The system of claim 12, wherein the first memory rank is to use a same data mask mapping scheme as the second memory rank.

15. The system of claim 11, wherein the memory controller is to include a storage device to be programmed with one of the at least one data mask mapping scheme used in the memory module.

16. The system of claim 15, wherein the storage device is to be coupled with a selection device to select one of the at least one data mask bit to be associated with the at least one data chunk according to the data mask mapping scheme.

* * * * *